Aug. 20, 1940.　　　C. C. FARMER　　　2,211,888
BRAKE MECHANISM
Filed July 9, 1938　　　5 Sheets-Sheet 2
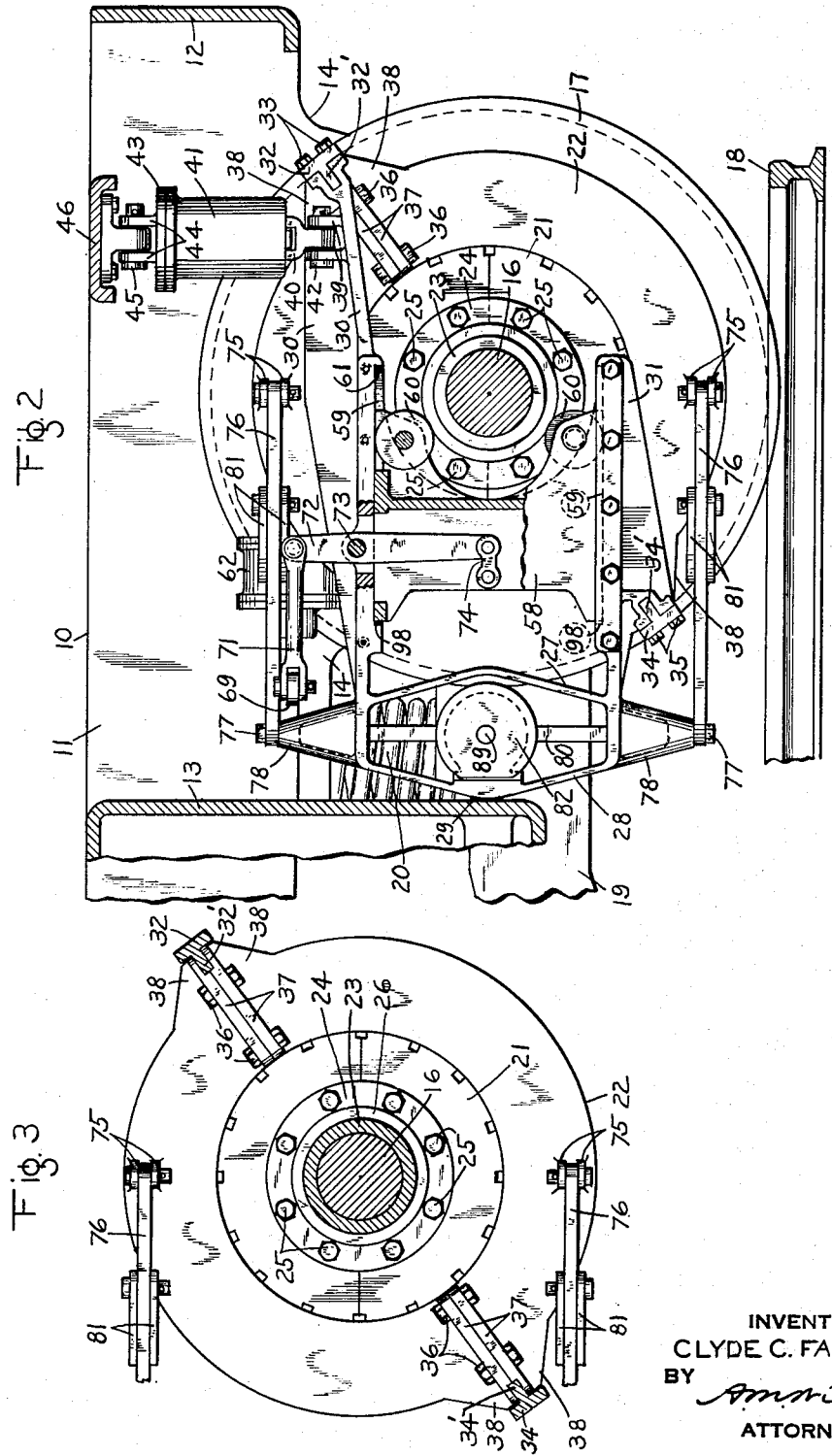
INVENTOR
CLYDE C. FARMER
BY
　　*A. M. Wiggins*
ATTORNEY

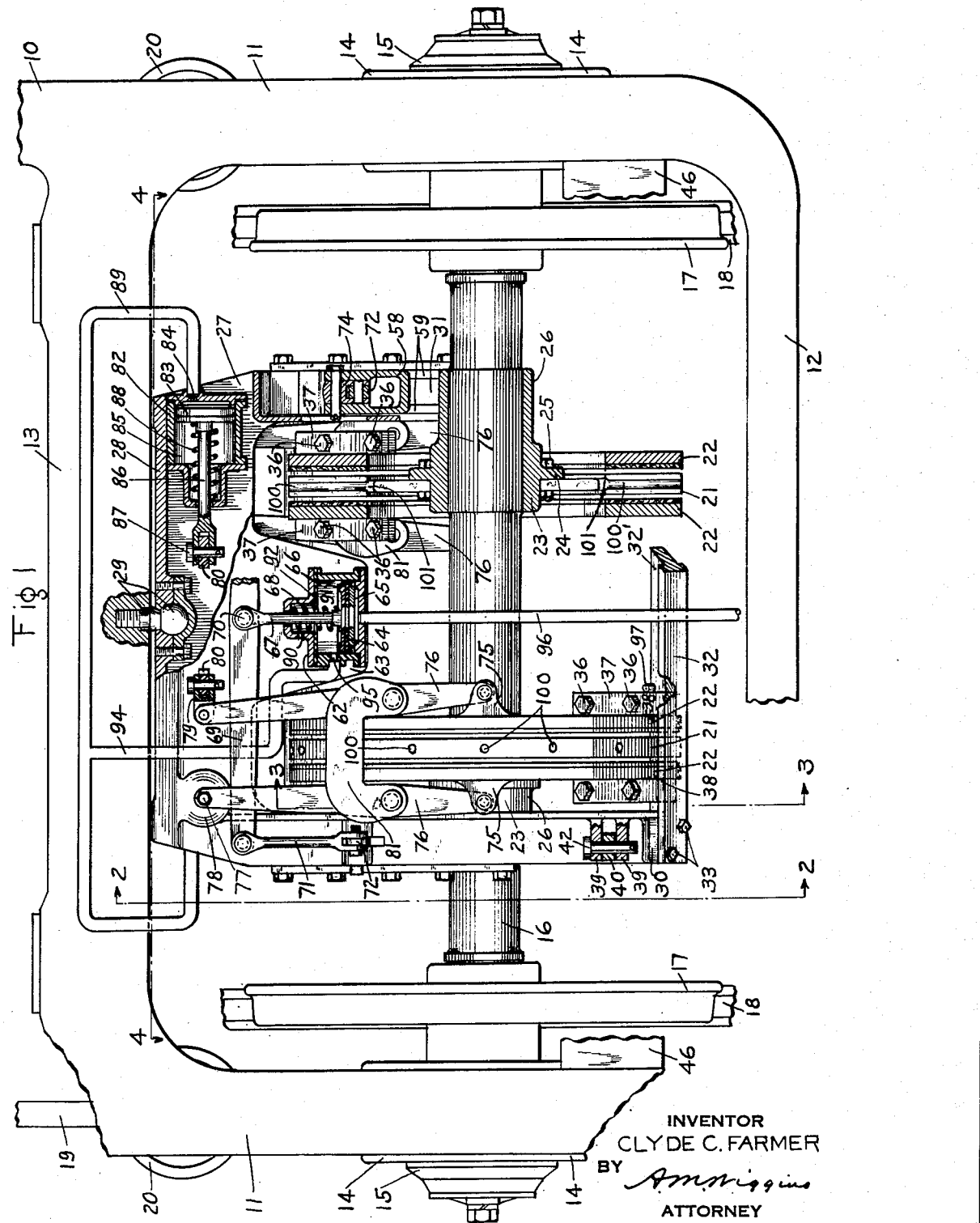

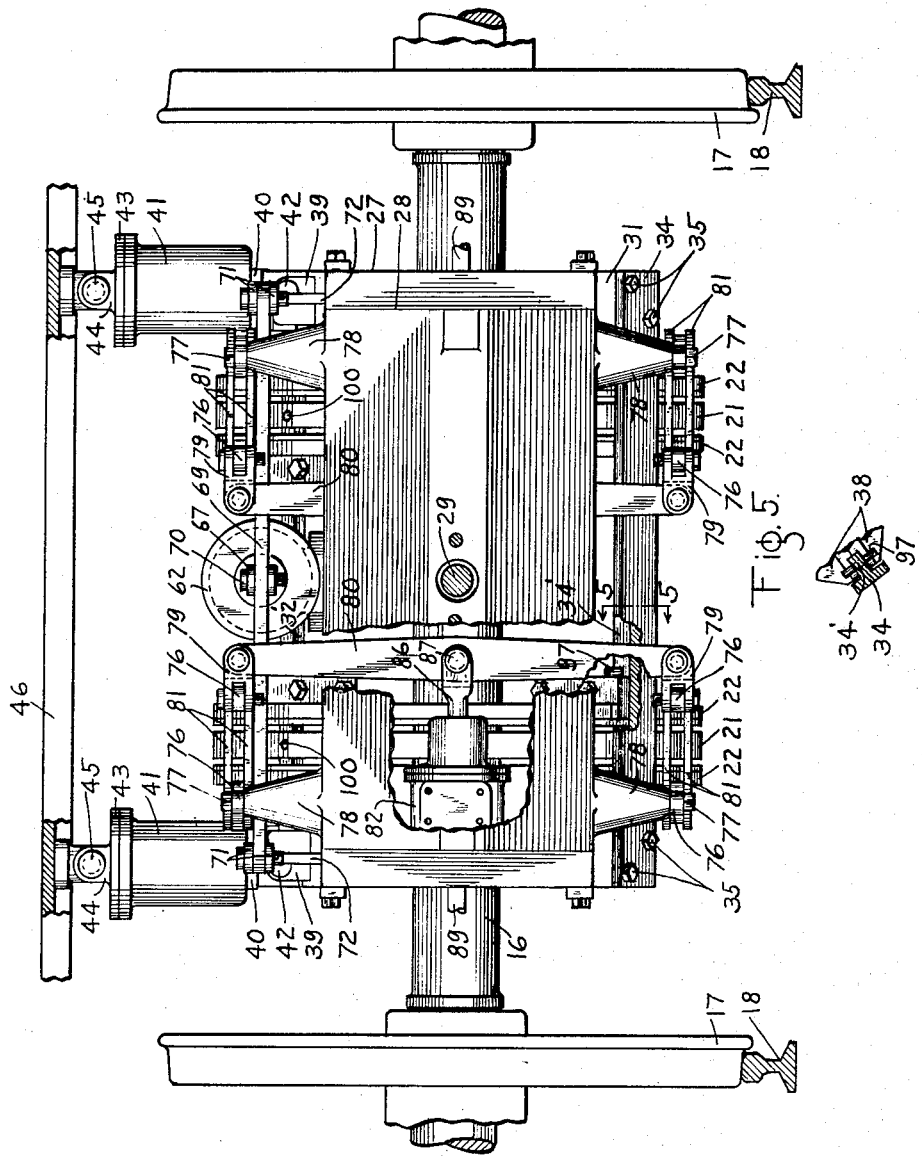

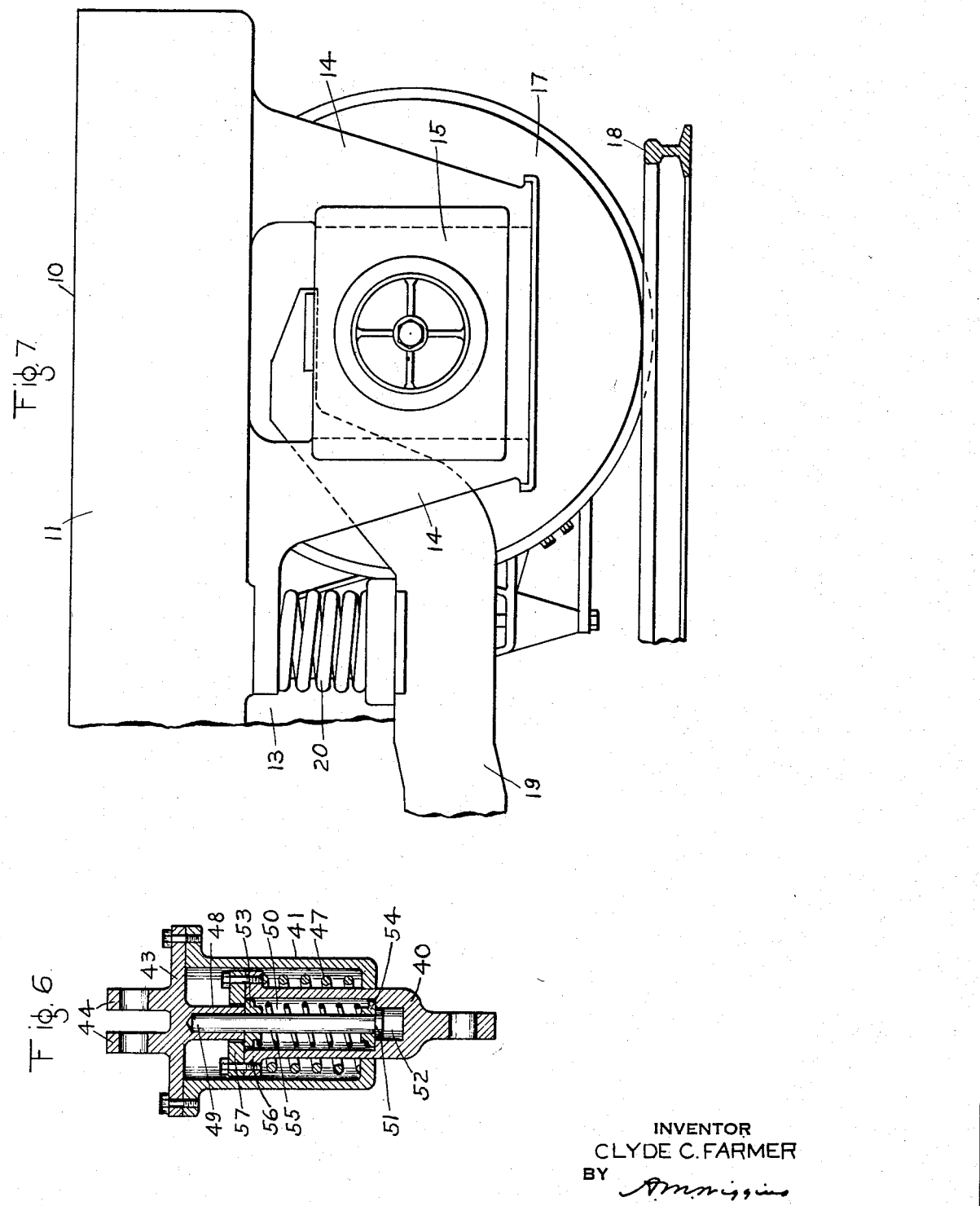

Aug. 20, 1940.   C. C. FARMER   2,211,888
BRAKE MECHANISM
Filed July 9, 1938   5 Sheets-Sheet 5
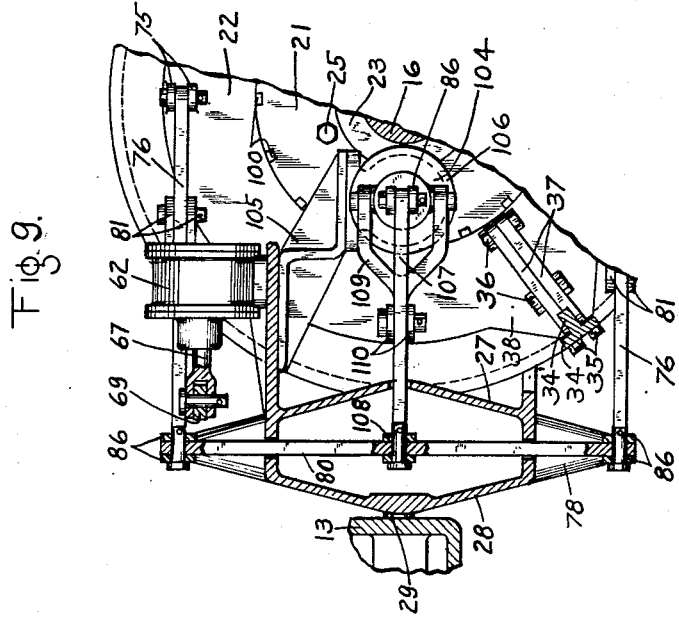
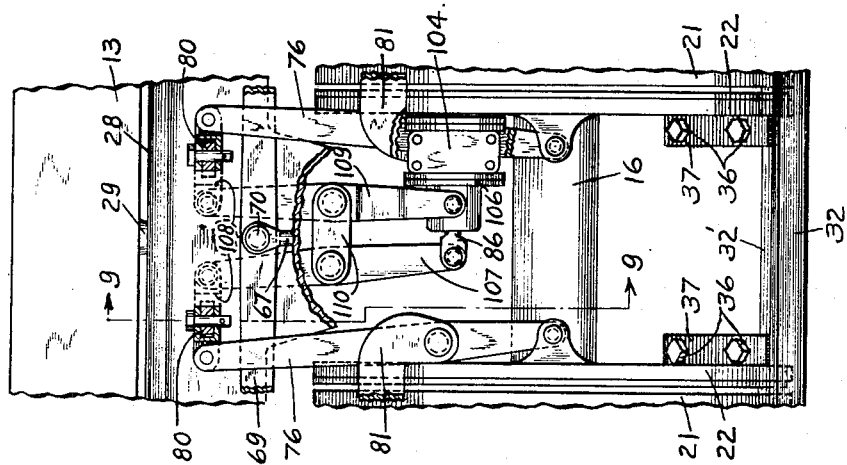
INVENTOR
CLYDE C. FARMER
BY
ATTORNEY Patented Aug. 20, 1940

2,211,888

UNITED STATES PATENT OFFICE 2,211,888

BRAKE MECHANISM

Clyde C. Farmer, Pittsburgh, Pa., assignor to The Westinghouse Air Brake Company, Wilmerding, Pa., a corporation of Pennsylvania Application July 9, 1938, Serial No. 218,384

25 Claims. (Cl. 188—153)

This invention relates to brake mechanism for vehicles and more particularly to the type embodying annular rotatable and non-rotatable friction braking elements adapted upon frictional interengagement to effect braking of one or more of the wheels of the vehicle.

One object of the invention is to provide an improved brake mechanism of the above type particularly adapted for use on the trucks of railway vehicles for braking the wheels thereof.

Another object of the invention is to provide an improved brake mechanism of the above type in which the major portion of the weight of the mechanism is carried by the truck frame as sprung weight, so as to minimize damage to the truck wheels or other unsprung parts of the truck due to the wheels striking irregularities in the rails, such as at rail joints, or the like.

In a brake mechanism of the type comprising annular friction braking elements some of which are carried by the truck frame and the others by the wheels or axle of the truck, it will be evident that the elements carried by the frame will move vertically with the frame relative to the elements associated with the wheels and axle, due to changes in load carried by the truck or due to vibration of the truck on the track rails, and will therefore at different times or under different conditions assume various positions eccentric to the elements carried by the wheels or axle. It is desirable that the annular braking elements carried by the truck frame be in concentric relation with those carried by the wheels or axle at the time such elements are moved into frictional braking engagement and another object of the invention is therefore to provide improved means for centralizing the braking elements carried by the truck frame with those associated with the wheel and axle assembly at the time said braking elements are moved into frictional engagement for effecting braking of the truck wheels.

Another object of the invention is to provide an improved disc brake mechanism of the above type comprising two braking units so constructed and arranged as to apply braking force to a wheel and axle assembly at two spaced portions thereof and having a single torque connection with the truck frame adjacent its transverse center so that during braking, forces will not be applied to the frame to cause sidewise tipping thereof and so that rocking of the frame from side to side, due to unevenness of the track or the like, will be relative to and therefore have no effect upon the operation of the brake mechanism.

Another object of the invention is to provide an improved brake mechanism of the above type so constructed and arranged that the truck frame is never subjected to the forces provided for effecting braking of the truck; the truck frame according to the invention being subject only to the forces required to hold the non-rotatable braking elements against rotation during braking, which forces are relatively small compared to those which are employed to effect the actual braking.

Other objects and advantages will be apparent from the following more detailed description of the invention.

In the accompanying drawings: Fig. 1 is a plan view of a portion of a railway vehicle truck showing, partly in plan and partly in section, the invention applied thereto; Figs. 2, 3 and 4 are sectional views taken substantially on the lines 2—2, 3—3 and 4—4 in Fig. 1; Fig. 5 is a sectional view taken on the line 5—5 in Fig. 4; Fig. 6 is a vertical, sectional view of a spring supporting device shown in elevation in Figs. 2 and 4; Fig. 7 is a side elevational view of a portion of one side of a vehicle truck with which the improved brake mechanism is associated for the purpose of illustration; Fig. 8 is a view similar to a portion of Fig. 1 and illustrating a modification of the invention; and Fig. 9 is a sectional view taken substantially on the line 9—9 in Fig. 8.

As shown in the drawings, the improved brake mechanism is associated with a truck of the type employed under railway vehicles and which, for the purpose of illustration, may comprise a truck frame 10 having the usual spaced side members 11 connected together by transversely extending end members 12 and transoms 13.

The side members 11 are provided at their opposite ends with the usual depending, spaced pedestals 14 slidably mounted on journal boxes 15. An axle 16, at each end of the truck is journaled at its ends in an oppositely disposed pair of journal boxes 15, while rigidly secured to said axle in any desired manner and in the usual spaced relation are a pair of wheels 17 adapted to roll on rails 18.

An equalizer bar 19 is disposed at each side of the truck frame with its ends resting on the top of the journal boxes 15 for support, while interposed between said equalizer bars and the truck side members 11 are springs 20 for resiliently supporting the truck frame 10 from the wheel and axle assembly.

Only a portion of the vehicle truck above described is shown in the drawings, but the construction of such trucks are so well known that the showing is deemed sufficient for a clear understanding of the invention. It is desired however to point out that since the truck frame 10 is resiliently supported by springs 20 from the assembly of axle 16 and wheels 17, said frame is capable of movement vertically relative to said assembly and will therefore assume various elevated positions with respect to said assembly due to vibration of the frame caused by irregularities in the track rails or the like or due to different degrees of load supported by the truck.

According to the invention, the improved disc brake mechanism is associated partly with the truck wheel and axle assembly and partly with the truck frame 10; the major portion of the weight of said mechanism being, however, carried by the truck frame as sprung weight, in order to minimize wear and possible damage to the truck wheels and other unsprung parts of the truck, due to the wheels engaging irregularities in the track rails such as at rail joints, or the like.

The improved brake mechanism comprises two, like braking units arranged in spaced relation between the wheels 17. Each of these braking units comprises an annular rotatable friction braking element 21 and two annular non-rotatable friction braking elements 22. All of these braking elements encircle the axle 16 with one of the non-rotatable elements 22 disposed at either side of each of the rotatable elements 21, the rotatable elements 21 being provided on their opposite faces with radially arranged braking surfaces adapted to be frictionally engaged by the adjacent surfaces of the non-rotatable elements for braking the wheels 17.

Two oppositely disposed sleeves or collars 23 are rigidly secured to the axle 16 in any desired manner, one of said sleeves being disposed adjacent one of the wheels 17 while the other sleeve is disposed adjacent the opposite wheel. Each of the sleeves 23 is provided adjacent its inner end with an annular flange 24 to which is secured by bolts 25 in concentric relation with wheels 17, one of the rotatable braking elements 21, whereby said element is secured to rotate with said wheels.

Outside of the flange 24 each sleeve 23 is provided with a cylindrical centering portion 26 concentric with the rotatable element carried by the sleeve.

Each of the rotatable elements 21 is preferably made in two, substantially semi-circular sections secured to the flange 24 in oppositely disposed, preferably abutting relation to facilitate assembly and replacement thereof on the sleeve 23.

Each of the non-rotatable elements 22, which is supported from the frame 10 by means to be later described, is provided with a central opening of such diameter as to permit vertical movement thereof with the truck frame 10 relative to the associated rotatable element 21 and axle 16 as will be later brought out in greater detail.

A cradle or brake supporting frame-like structure 27 is disposed between one side of axle 16 and one of the transverse members of the truck frame, preferably the transom 13. The cradle 27 comprises a back portion 28 which is pivotally connected intermediate its ends to a transverse central portion of transom 13 at substantially the same level as axle 16 through the medium of a universal connection such as a ball and socket joint 29. By reason of this ball and socket connection it will be evident that the truck frame 10 may rock sidewise relative to the cradle 27, while the cradle may move with the wheels relative to the truck frame as the wheels follow irregularities in the track rails 17, or the like.

The cradle 27 is provided at each end of the back portion 28 with a pair of vertically spaced, substantially horizontally extending arms 30 and 31, the arms 30 being longer than the arms 31 and projecting over the top of axle 16, while the shorter arms 31 are disposed at a level below and terminate substantially beneath said axle. It will be noted that both sets of arms 30 and 31 are spaced from the top and bottom of axle 16 so as to permit movement of the cradle in a vertical direction relative to the axle without engagement between said arms and said axle.

A T bar 32 extends between and is secured by bolts 33 to the end of the longer arms 30 disposed above the axle 16, each of said arms being provided with a slot arranged substantially radially with respect to axle 16 to receive the end portions of the leg 32' of said bar. A like T bar 34 extends between and is secured by bolts 35 to the short arms 31 below the axle 16, the bar 34 being so arranged that the leg portion 34' thereof is opposite to and in alignment with that of the bar 32.

Each of the non-rotatable elements 22 is preferably made in two, like, substantially semi-circular sections arranged opposite to each other in abutting relation, with the two sections rigidly secured together by bolts 36 provided through flanges 37 which extend from the faces of the sections opposite the braking faces thereof.

Each section of each non-rotatable element 22 is provided at its ends with a portion 38 extending radially outwardly therefrom. In the end of each portion 38 there is a notch, the notch in the two cooperating portions of each two sections, when secured together, acting to provide a slot to slidably receive the leg portion 32' or 34' of one of the T bars 32 or 34. It will be noted that each of the non-rotatable elements is provided with two such notches which are diametrically opposite and said elements are adapted to be mounted in cradle 27 so that the leg 32' of T bar 32 is in one of said notches while the leg 34' of T bar 34 is in the other of said notches, whereby the non-rotatable elements are supported by and slidable on said bars in the direction towards and away from the rotatable braking elements 21. Engagement between the T bars 32 and 34 and the non-rotatable elements 22 is also adapted to hold said elements against turning during braking, which will be later described.

Each of the longer arms 30 is provided adjacent its outer end with a pair of upstanding, spaced ears 39. One end of a stem 40 of a spring supporting device 41 is disposed between the ears 39 on each arm 30 and is pivotally connected thereto by a pin 42. Each spring supporting device 41 comprises a casing the upper end of which is closed by a cover 43 provided on its outer face with a pair of upstanding ears 44 which are pivotally connected through the medium of a pin 45 to any suitable portion of the truck frame 10 such as a member 46 extending between and secured at its opposite ends to the side frames 11.

The cradle 27 is thus connected to and normally supported from the frame 10 at three points, namely, the ball and socket connection 29 at one end and through the two spring supporting devices 41 at the opposite end.

The pivotal connections between devices 41 and the cradle 27 and frame 10 are so arranged as to permit movement of the connected end of cradle 27 with the axle 16 transversely of the truck relative to the frame 10 while sufficient looseness is provided in such pivotal connections as to permit movement of the lower end of the devices in the direction of the length of the truck upon vertical movement of the arms 30 relative to axle 16, under conditions which will be later brought out.

As shown in Fig. 6 of the drawings, the stem 40 of each of the spring supporting devices 41 extends into the device and therein is provided with an outwardly extending flange portion 56 between which and the lower end of the casing of the device there is provided a spring 47 which acts to move the stem 40 inwardly of the device. The springs 47 in the two devices 41 are so designed that the combined force of both, when in the position shown in Fig. 6, is adapted to just counterbalance the weight of the connected portion of cradle 27 and a portion of the weight of the brake mechanism carried by said cradle.

The cover 43 of each spring supporting device 41 is provided on its inner face with a depending centrally located boss 48 having an axial bore in which there is secured in any desired manner one end of a pin 49 which extends through a bore 50 provided lengthwise of the stem 40. The lower end of each pin 49 is provided with a head 51 which is disposed to move in a counterbore 52 provided in the stem 40 below the bore 50.

Slidably mounted on the stem 49 in each of the spring supporting devices 41 are two oppositely disposed spring seats 53 and 54 between which there is interposed a coil spring 55 which encircles the pin 49 and which is under compression. In the normal position of the parts of each spring supporting device 41 the spring seat 54 engages the bottom of the bore 50, while the spring seat 53 engages the end of the boss 48, thereby confining the associated coil spring 55 under pressure between said seats.

Encircling the boss 48 within each of the spring supporting devices 41 is a ring 57 which is secured to flange 56 on the inner end of the stem 40. The ring 57 has a central opening of smaller diameter than that of the bore 50 so as to provide a shoulder for engagement with the spring seat 53.

It is well known that as a car truck moves along track rails and strikes irregularities therein, the truck frame tends to bounce or move vertically relative to the wheel and axle assembly. It will be evident that under such conditions the end of the cradle 27 carried by springs 47 will also tend to move vertically relative to the truck frame. However, in case the end of cradle 27 supported by the spring supporting devices 41 tends to move upwardly relative to the truck frame 10 this movement is transmitted through the stems 40 of the supporting devices to the spring seats 54 and acts to urge said seats against the pressure of the springs 55 the opposite ends of which are fixed against movement due to the spring seats 53 engaging the ends of the bosses 48. As a result, the force of the two springs 55 becomes immediately effective to oppose or dampen such movement and return the cradle to its normal position with respect to the truck frame.

In case the cradle 27 tends to move downwardly relative to the truck frame the rings 57 in the spring supporting devices 41 pick up the spring seats 53 and love them against the pressure of the springs 55 the lower ends of which are at this time held in a fixed position by the engagement of the spring seats 54 with the heads 51 on the end of pins 49. As a result, the two springs 55 become immediately effective to oppose such downward movement of the cradle 27 and to return said cradle to its normal position with respect to the truck frame 10.

In other words, the two springs 55 are provided to oppose or dampen movement of the cradle 27 out of its normal position with respect to the frame 10, whereby the cradle is substantially held against oscillation relative to the truck frame when the brakes on the vehicle are released and the parts of the mechanism are in their normal position supported by the truck frame.

A cross-head 58, disposed at the transom side of axle 16 is mounted to slide in a substantial horizontal direction in suitable parallel slots 59 provided in the adjacent faces of each set of arms 30 and 31. Each of the cross-heads 58 is provided in the face adjacent axle 16 with two rollers 60 disposed one above the other the same distance from the axis of the non-rotatable elements 22 and spaced apart a distance equal to or just slightly exceeding the diameter of the cylindrical centering portion 26 of the adjacent sleeve 23 on axle 16. Each of the cross-heads is cut out between the rollers 60 to receive the axle 16 without engagement between the cross-head and axle.

In the drawing, the cross-heads 58 are shown in their normal position, that is, the position occupied when the brakes on the truck are released, and it will be noted that there is a certain amount of clearance between rollers 60 and the sleeves 23 on the axle 16, so that the cradle 27 and the parts of the brake mechanism carried thereby are free to be moved with the truck frame 10 by the spring supporting devices 41 relative to the axle 16.

In Fig. 2 of the drawings, the same clearance space is shown between each of the rollers 60 and sleeves 23. This condition will only be obtained when the truck is in a substantially, semi-loaded condition. In case the truck frame 10 is in its empty condition it will be elevated above the position shown with respect to axle 16 and sleeves 23 in which case there will be less clearance space between the lower rollers 60 and sleeves 23 than between the upper rollers 60 and said sleeves, while in case the truck frame 10 is in the position assumed supporting a fully loaded vehicle the clearance space between the upper rollers 60 and sleeves 23 will be less than between the lower rollers and said sleeves. In other words, the normal positions of the rollers 60 with respect to the cylindrical portions 26 of sleeves 23 will vary with the loaded and hence elevated position of the truck frame.

When an application of the brakes is effected, as will be later described, the cross-heads 58 are adapted to be moved from their normal position, just described, in the direction of the sleeves 23 to a centering position in which the rollers 60 engage substantially diametrically opposite portions of the cylindrical portions 26 of the sleeves 23 in which position the non-rotatable elements 22 are adapted to be in substantial, concentric braking relation with the rotatable elements 21.

In case the cross-heads 58 are in the position shown in the drawings at the time an application of brakes is effected, the movement thereof to the centering position just described will be merely relative to the sleeves 23 on axle 16. However, if at this time the cross-heads 58 are in a position above that shown, the lowermost rollers 60 will engage the cylindrical portions 26 of the sleeves 23 somewhere between the bottom and mid portions thereof and as said rollers are then forced against the sleeves, by means to be later described, said rollers roll or are propelled along the peripheries of the sleeves in a downwardly direction to their centering position and during such movement act to rock the cradle 27 in a clockwise direction, as viewed in Fig. 2 of the drawings, about the connection 29 with the truck frame, and thereby draw the non-rotatable elements 29 into concentric relation with the rotatable elements 21. In case the cross-heads 58 are in a position below that shown at the time an application of the brakes is initiated, the topmost rollers 60 will first engage the sleeves 23 and then act upon movement along the peripheries of portions 26 of said sleeves to rock the cradle 27 in a direction opposite to that above described and thereby move the non-rotatable elements 22 upwardly into concentric relation with the rotatable elements 21.

The cradle 27 will be rocked relative to the truck frame 10 as just described a degree which depends upon the elevated position of the truck frame, but regardless of this degree, when the rollers 60 obtain their centering position the non-rotatable elements 22 will be in concentric relation with the rotatable elements 21 and will be held in such relation by the upper and lower rollers 60 cooperating with substantially diametrically opposite parts of the cylindrical portions 26 of sleeves 23.

When the cradle 27 is rocked relative to the truck frame 10 as just described, such movement is opposed by either one or both of the springs 47 and 55 in the supporting devices 41, depending upon the direction of rocking, but this is immaterial.

When the brakes are released after an application, as will be later described, the cross-heads 58 are adapted to be drawn from their centering position back to their normal position in which the rollers 60 are disengaged from the sleeves 23 to permit the springs 47 to again support the associated end of the cradle 27 from the truck frame.

A fluid pressure controlled cylinder device 62 is provided for controlling movement of the cross-heads 58. This cylinder device is mounted on a shelf 63 extending outwardly from the back portion 28 of the cradle between the arms 30 and comprises a casing containing a piston 64 having at one side a pressure chamber 65 and at the opposite side a chamber 66 which is open to the atmosphere in any desired manner as by way of a release port 90.

The piston 64 is provided with a rod 67 extending through the non-pressure chamber 66 and a suitable opening in the end wall thereof while in said chamber there is provided a return spring 68 acting on said piston for moving it to its normal position shown in the drawings. The piston 64 is provided on its non-pressure face with an annular sealing bead 91 adapted in one position of the piston to effect sealing engagement with a gasket 92.

The end of the piston rod 67 is pivotally connected to the center of an equalizer bar 69 through the medium of a pin 70, while each end of said bar is operatively connected through a rod 71 to one end of a substantially vertically disposed lever 72. Each of the levers 72 is pivotally connected by a pin 73 midway between its ends to the cradle 27, while the opposite end of each of said levers is pivotally connected to one of the cross-heads 58 through the medium of a link 74.

The spring 68 in the cylinder device 62 is adapted to act through the bar 69 and connecting rods 71 to turn the levers 72 in a clockwise direction, as viewed in Fig. 2 of the drawings, for thereby shifting the cross-heads 58 to their normal positions shown in the drawings. When fluid under pressure is supplied to the pressure chamber 65, in a manner to be later described, the piston 64 is adapted to be moved from the position shown into sealing engagement with gasket 92 and during such movement is adapted to actuate the equalizer bar 69 and thereby turn the levers 72 in a counterclockwise direction for moving the cross-heads 58 from the position shown in the drawings to their centering position above described. A stop 61 is provided in each of the arms 30 and 31 of the cradle 27 adapted to be engaged by the cross-heads 58 in case one obtains the centering position ahead of the other to ensure the other obtaining said position by the time the actuating piston 64 engages the gasket 92.

Each of the non-rotatable elements 22 is provided with two diametrically opposite pairs of outstanding lugs 75, one pair directly above the axle 16 and the other pair below the axle, and pivotally connected to each pair of these lugs is one end of a substantially horizontally disposed brake lever 76. The opposite ends of the two brake levers connected to each of the outside non-rotatable elements 22 are pivotally connected through the medium of pins 77 to oppositely disposed projections 78 extending from the cradle 27, while the corresponding ends of the two brake levers 76 connected to each of the inside non-rotatable elements 22 are pivotally connected through the medium of suitable links 79 to the opposite ends of a vertically disposed equalizer lever 80. In each brake unit the levers 76 connected to both the top and bottom portions of the two non-rotatable elements are pivotally connected together intermediate their ends by means of links 81 which are U-shaped in order to bridge without engaging the intermediate rotatable braking element 21.

A pair of oppositely disposed brake cylinder devices 82 are secured to the back portion 28 of the cradle 27, one of said brake cylinder devices being provided for controlling the operation of each of the equalizer levers 80.

Each of the brake cylinder devices 82 is disposed adjacent one end of the cradle substantially midway between the top and bottom thereof and comprises a piston 83 having at one side a pressure chamber 84 and at the opposite side a non-pressure chamber 85 which is open to the atmosphere in any suitable manner. Each of the pistons 83 is provided with a piston rod 86 extending through the non-pressure chamber 85 and the end of the casing and pivotally connected at its outer end through the medium of a pin 87 to one of the equalizer levers 80 midway between the ends thereof. A release spring 88 is provided in the non-pressure chamber 85 of each brake cylinder device and acts on the brake cylinder piston 83 for urging it to its release position shown in the drawings.

The pressure chamber 84 in both brake cylinder devices 82 is connected to a common type 89 which is connected by a pipe 94 to a passage 95 in the centralizing cylinder, which passage is adapted to be opened to the pressure chamber 65 when the centralizing piston 64 is in engagement with gasket 92.

The pressure chamber 65 in the centralizing device 62 is connected by a pipe 96 to any suitable device, such as a conventional type of triple valve device employed on railway cars, which is operative to supply fluid under pressure to said pipe in order to effect an application of the brakes of the trucks and to release fluid under pressure from the said pipe in order to effect a release of the brakes.

Operation

Let it be assumed that the pipe 96 is vented by way of a triple valve device (not shown) or in any other desired manner. With the pipe 96 vented spring 68 in the centralizing cylinder device 62 will be acting to hold the piston 64 in the position shown in the drawings and thereby acting through the piston rod 67, equalizer bar 69, rods 71 and levers 72 to hold the cross-heads 58 in their normal position in which the rollers 60 are moved away from the sleeves 23. With the cross-heads 58 in their normal position the cradle 27 will be supported in its normal position from the truck frame 10 through the medium of the ball and socket connection 29 and by springs 47 in the supporting devices 41 and will therefore move with and occupy positions corresponding to those assumed by the truck frame 10 with respect to the axle 16.

With the centralizing piston 64 in its release position, shown in the drawings, the pressure chamber 84 in both brake cylinder devices 82 is vented through pipes 89 and 94 and passage 95 in the centralizing cylinder device to the non-pressure chamber 66 and from thence through vent passage 90 in said device to the atmosphere, so that the brake cylinder release springs 88 are permitted to act to hold the brake cylinder pistons 83 and thereby the piston rods 86, equalizer levers 80, links 79, brake levers 76 and the connected non-rotatable braking elements 22 in their release position, in which said elements are spaced from the rotatable elements 21, as shown in the drawings and as will be more fully described later in connection with effecting a release of the brakes after an application. With the non-rotatable elements 22 thus spaced from the rotatable elements 21, said rotatable elements are free to rotate with the axle 16 and thereby with the wheels 17 as the truck moves along rails 18.

If it is desired to retard or stop rotation of wheels 17 or in other words to brake the truck when it is moving along the rails 18, fluid under pressure is supplied to the pipe 96 by the operation of a triple valve device or the like.

Fluid pressure thus supplied to pipe 96 flows to pressure chamber 65 in the centralizing device 62 and therein acts to move the piston 64 in the direction against spring 68. This movement of the piston 64 and thereby of the rod 67 acts to operate the equalizer bar 69 and connecting rods 71 to turn the levers 72 in a counterclockwise direction, as viewed in Fig. 2 of the drawings. This movement of levers 72 slides the cross-heads 58 forward toward axle 16 bringing the rollers 60 into cooperating relation with the centralizing cylindrical parts 26 of the sleeves 23 for centralizing the non-rotatable element 22 with respect to the rotatable elements 21 as hereinbefore described. This centralizing action is completed by the time the centralizing piston 64 moves past the brake cylinder port 95 and into sealing engagement with the gasket 90.

When the centralizing piston 64 moves past and thus connects the brake cylinder port 95 to the pressure chamber 65, fluid under pressure supplied to said chamber then flows to pipe 94 and from thence through pipe 89 to the brake cylinder devices 82.

Fluid under pressure thus supplied to each of the brake cylinder devices 82 acts on the piston 83 therein to move said piston against the release spring 88 and thereby operate the connected equalizer lever 80 to move the ends of the connected brake levers 76 in such a direction as to move the opposite ends of said levers and thereby the connected non-rotatable element 22 toward and into engagement with the braking face of the adjacent rotatable element 21. When the inside non-rotatable elements 22 are thus moved apart and into engagement with the adjacent rotatable elements 21, said rotatable elements become a fixed fulcrum for the inside levers 76, so that further operation of said levers then acts through the links 81 to move the outside brake levers 76 in such a direction as to shift the outside or connected non-rotatable elements 22 into engagement with the adjacent rotatable elements 21. After the non-rotatable elements 22 in each brake unit are thus moved into engagement with the opposite faces of the rotatable element 21, further pressure applied by the brake cylinder devices to the inside levers 76 then acts to force the non-rotatable elements 22 into frictional contact with the rotatable elements 21 with such force as to effect braking of the rotatable elements and thereby of the axle 16 and wheels 17 for retarding or stopping rotation of said wheels, as desired.

The degree of pressure with which the non-rotatable elements 22 are thus forced into frictional engagement with the rotatable elements 21 can be varied as desired by varying the pressure of fluid supplied to the brake cylinder pressure chambers 84, in the usual manner, whereby any desired rate of retardation may be obtained.

Each of the rotatable elements 21 is provided with a plurality of spaced radial bores 100 open at the periphery of the element and connected at their inner ends with cross passages 101 which open to the opposite faces of said element, and through these bores and passages air is adapted to constantly circulate when said element is rotating. This circulation of air between the braking faces of the rotatable elements 21 is adapted to carry away heat created by the frictional braking engagement of the non-rotatable elements 22, in order to maintain the temperature of said elements at a sufficiently low degree to provide efficient braking.

It will be noted that in this improved structure the truck frame 10 is not subjected during braking to the relatively high pressure developed in the brake cylinder devices 82 and transmitted to the non-rotatable elements 22 as in conventional type of brake equipment. The truck frame 10 merely acts through the medium of the ball and socket connection 29 to support one end of the cradle 27 and to hold the non-rotatable elements against turning during braking. The force required to hold the non-rotatable elements against turning is however only a relatively small portion of that developed in the brake cylinder devices and since the torque arm between said elements and the ball and socket connection 29 is relatively long the force applied to the truck frame is even less. This is very desirable in that a truck frame with which the invention is to be employed need be substantially no stronger than required for supporting the loaded vehicle, in contrast to trucks designed for use with conventional type of brake equipment in which bracing in one form or another is required for resisting braking forces.

An important feature of the invention is the single connection through the ball and socket joint 29 between the braking unit and the truck frame. By this arrangement, rocking of the truck frame relative to the wheels while the brakes are applied will have no effect upon the operation of the brake units, and further, said units are free to move with the wheels 17 relative to the truck frame 10, due to inequalities in the track rails 18 or the like and thereby avoid subjecting the truck frame to stresses which would tend to cause said frame to tip in either one direction or the other during braking. In other words, due to the single pivotal connection 29 between the cradle 27 and truck frame 10, the operation of the mechanism during braking will have no adverse effect upon the truck frame, while movement of the truck frame relative to the wheels 17 will in no way affect the operation of the braking units during braking.

It will be noted that since the supply of fluid under pressure to the brake cylinder devices 82 for applying the brakes is controlled by the centralizing piston 64, the brakes can not be applied before the non-rotatable elements 22 are moved into concentric relation with the rotatable elements 21, but immediately upon obtaining such relation the brakes can be applied. This is very desirable in that it ensures prompt application of brakes just as soon as the non-rotatable elements are moved to their concentric braking position.

When it is desired to effect a release of the brakes after an application fluid under pressure is vented from the pipe 96 and thereby from the centralizing piston chamber 65 and at the same time from the brake cylinder piston chambers 84 through pipes 89 and 94 and said chamber.

When the pressure acting on the brake cylinder pistons 83 is thus reduced sufficiently, the release springs 88 return said pistons to their release position, as shown in the drawing, and during such movement operate the equalizing levers 80 to first release the braking pressure on brake levers 76 urging the non-rotatable elements 22 into frictional engagement with the rotatable elements 21 and then further movement of the equalizing levers 80 operate the connected brake levers 76 to move the non-rotatable elements 22 into such spaced relation as to be disengaged from the respective rotatable elements 21. This spacing may be obtained in any desired manner, such for instance as by the use of stop pins 97 provided through the leg portions 32', 34' of the support bars 32 and 34 and so arranged as to be engaged by the adjacent portions of the inner non-rotatable elements upon movement thereof a predetermined distance away from the adjacent rotatable elements 21. After the inner non-rotatable elements are moved into contact with the pins 97, further release movement of the connected levers 76 acts through the links 81 to move the outside non-rotatable elements 22 a predetermined distance away from the rotatable elements 21.

When the pressure of fluid acting on the centralizing piston 64 is reduced sufficiently, spring 68 acting on the piston returns said piston to its release position which movement acts through the equalizer bar 69 and connecting rods 71 to turn the levers 72 in such a direction as to draw the crossheads 58 out of their centralizing position back to their normal position, in which the rollers 60 are disengaged and spaced from the sleeves 23 for again permitting movement of the cradle 27 with the truck frame relative to the axle 16.

As cross-heads 58 are returned to their normal position the spring supporting devices 41 again become effective to support the free end of the cradle 27 as will be evident.

In effecting a release of the brakes the fluid pressure from the brake cylinders 82 is released through pipe 96 as above described until the centralizing piston 64 moves over the brake cylinder port 95 on its return to its normal position, after which any fluid pressure still remaining in the brake cylinders is vented by way of the non-pressure chamber 66 and thence to the atmosphere through the vent passage 98.

If desired, both of the braking units on axle 16 may be controlled by a single brake cylinder device instead of being independently controlled by the two brake cylinder devices 82 as above described. A construction embodying this modification is shown in Figs. 8 and 9 of the drawings. In the modification a single brake cylinder device 104, disposed to operate in a direction transversely of the truck like the brake cylinder devices 82 above described, is disposed in the cradle 27 at one side of the axle 16 substantially midway between the top and bottom of the cradle and is supported therein on a bracket 105 secured to any desired part of the cradle.

The brake cylinder device 104 comprises a casing 106 containing a piston (not shown) and a piston rod 86 adapted to be operated by said piston. One end of a brake lever 107 is connected to the piston rod 86 while the opposite end is connected through the medium of a link 108 to one of the equalizer levers 80. Another brake lever 109 is provided with a yoked end pivotally connected to the brake cylinder casing 106 while the opposite end of said lever is pivotally connected by link 108 to the other equalizer lever 80. The two levers 107 and 109 are connected together intermediate their ends by a link 110.

In operation, when the piston rod 86 of the brake cylinder device 104 is moved outwardly of the casing 106 in order to effect an application of the brakes, the brake lever 107 is rocked in a clockwise direction, as viewed in Fig. 8, and through the medium of link 110 acts to rock the lever 109 in the opposite direction. This rocking movement of the levers 107 and 109 is transmitted through the links 108 to the equalizer levers 80 and acts to draw said levers towards each other for thereby operating the brake levers 76 to effect an application of the brakes on the truck in the same manner as effected by the two brake cylinder devices 82, above described.

When fluid under pressure is released from the brake cylinder device 104 the piston rod 86 is moved into the casing 105 by a release spring (not shown) and this movement acts to draw the connected end of the lever 107 toward the yoked end of the lever 109 and due to the connection of links 110 between said levers, the equalizer levers 80 are moved apart for thereby operating the brake levers 76 to draw the nonrotatable elements 22 out of frictional engagement with the rotatable elements 22, as above described.

Either of the brake arrangements above described is adapted to be employed in connection with substantially all conventional type of trucks used under railway vehicles to provide efficient and flexible braking thereof. Both arrangements are relatively simple in construction and so arranged as to be applied to and maintained on a truck without any dismantling of the truck.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. A brake mechanism for a vehicle truck having a wheel and axle assembly and a truck frame resiliently carried on said assembly, said mechanism comprising a plurality of annular, rotatable friction braking elements encircling said axle and secured to rotate with said assembly in concentric relation therewith, annular non-rotatable friction braking elements encircling said axle and adapted to frictionally engage said rotatable elements to effect braking of said assembly, and a rigid cradle like structure carrying at one end said non-rotatable elements and cooperative with said assembly to support said non-rotatable elements in cooperative relation with said rotatable elements, said structure having at the opposite end a single, universal joint connection with said truck frame for holding said non-rotatable elements against rotation.

2. A brake mechanism for a vehicle truck having a wheel and axle assembly and a truck frame resiliently carried on said assembly, said mechanism comprising a plurality of annular, rotatable friction braking elements encircling said axle and secured to rotate with said assembly in concentric relation therewith, annular non-rotatable friction braking elements encircling said axle and adapted to frictionally engage said rotatable elements to effect braking of said assembly, a rigid cradle like structure having a universal joint connection with said truck frame and connected to said non-rotatable elements for supporting and holding said non-rotatable elements against rotation, and means operatively connecting said structure and assembly for centralizing said non-rotatable elements with said rotatable elements.

3. A brake mechanism for a vehicle truck having a wheel and axle assembly and a truck frame resiliently carried on said assembly, said mechanism comprising a plurality of annular, rotatable friction braking elements encircling said axle and secured to rotate with said assembly in concentric relation therewith, annular non-rotatable friction braking elements encircling said axle and adapted to frictionally engage said rotatable elements to effect braking of said assembly, and a rigid cradle like structure carrying at one end said non-rotatable elements and cooperative with spaced portions of said assembly to support said non-rotatable elements in cooperative relation with said rotatable elements, and means providing a universal joint connection between said structure and truck frame at one side of said assembly.

4. A brake mechanism for a vehicle truck having a wheel and axle assembly and a truck frame resiliently carried on said assembly, said mechanism comprising a plurality of annular, rotatable friction braking elements encircling said axle and secured to rotate with said assembly in concentric relation therewith, annular non-rotatable friction braking elements encircling said axle and adapted to frictionally engage said rotatable elements to effect braking of said assembly, a rigid, cradle like structure having at one side of said assembly a single, universal coupling connection with said truck frame, means connecting said non-rotatable elements to said structure for supporting said non-rotatable elements and for holding same against rotation, and means associated with said structure and cooperative with said assembly for securing said non-rotatable elements in cooperative relation with said rotatable elements.

5. A brake mechanism for a vehicle truck having a wheel and axle assembly and a truck frame resiliently carried on said assembly, said mechanism comprising a plurality of annular, rotatable friction braking elements encircling said axle and secured to rotate with said assembly in concentric relation therewith, annular non-rotatable friction braking elements encircling said axle and adapted to frictionally engage said rotatable elements to effect braking of said assembly, and a rigid cradle like structure carrying at one end said non-rotatable elements and cooperative with spaced portions of said assembly to support said non-rotatable elements in cooperative relation with said rotatable elements, and means providing a universal joint connection between said structure and a central transverse portion of said truck frame at one side of said assembly.

6. A brake mechanism for a vehicle truck having a wheel and axle assembly and a truck frame resiliently carried on said assembly, said mechanism comprising a plurality of annular, rotatable friction braking elements encircling said axle and secured to rotate with said assembly in concentric relation therewith, annular non-rotatable friction braking elements encircling said axle and adapted to frictionally engage said rotatable elements to effect braking of said assembly, a rigid cradle like structure having a universal joint connection with said truck frame and connected to said non-rotatable elements for supporting and holding said non-rotatable elements against rotation, means for connecting said structure to said assembly in a position for centralizing said non-rotatable elements with said rotatable elements, and a brake cylinder device carried by said structure and operatively connected to said non-rotatable elements for actuating same.

7. A brake mechanism for a vehicle truck having a wheel and axle assembly and a truck frame resiliently carried on said assembly, said mechanism comprising a plurality of annular, rotatable friction braking elements encircling said axle and secured to rotate with said assembly in concentric relation therewith, annular non-rotatable friction braking elements encircling said axle and adapted to frictionally engage said rotatable elements to effect braking of said assembly, a rigid, cradle like structure disposed at one side of said assembly and having centrally at one side a universal joint torque connection with a central transverse portion of said truck frame and having at the opposite side outwardly projecting portions, support rods secured to said outwardly projecting portions for supporting said non-rotatable elements and for holding same against rotation, and means associated with said outwardly projecting portions cooperative with said assembly for securing said non-rotatable elements in cooperative relation with said rotatable elements.

8. A brake mechanism for a vehicle truck having a wheel and axle assembly and a truck frame resiliently carried on said assembly, said mechanism comprising a plurality of annular, rotatable friction braking elements encircling said axle and secured to rotate with said assembly in concentric relation therewith, annular non-rotatable friction braking elements encircling said axle and adapted to frictionally engage said rotatable elements to effect braking of said assembly, a rigid cradle like structure disposed at one side of said assembly carrying said non-rotatable elements, means providing a universal joint torque connection between one end of said structure and a central transverse portion of said truck frame, means for securing the opposite end of said structure to said assembly for movement therewith for holding said non-rotatable elements in cooperative relation with said rotatable elements, and fluid pressure controlled means carried by said structure and operatively connected to said non-rotatable elements for actuating same.

9. A brake mechanism for a vehicle truck having a wheel and axle assembly and a truck frame resiliently carried by said assembly, said mechanism comprising two brake units encircling said axle with one unit adjacent each of the wheels of said assembly, each brake unit comprising an annular rotatable friction brake element secured to rotate with said assembly and an annular non-rotatable friction braking element adapted to be moved into frictional engagement with said rotatable element for effecting braking thereof, a rigid cradle like structure disposed at one side of said assembly and comprising a back portion having centrally a universal joint torque connection with a central transverse portion of said frame, arms projecting from said back portion supporting said non-rotatable elements and for holding same against rotation, and means associated with said arms and cooperative with said assembly for centralizing said non-rotatable elements with said rotatable elements.

10. A brake mechanism for a vehicle truck having a wheel and axle assembly and a truck frame resiliently carried by said assembly, said mechanism comprising a plurality of spaced annular, rotatable friction braking elements disposed between the wheels of said assembly in concentric relation therewith and secured to rotate with said assembly, a plurality of annular, non-rotatable friction braking elements for frictionally engaging said rotatable elements, said non-rotatable elements encircling said axle and being capable of movement in a vertical direction relatively thereto, a rigid cradle like structure having at one end a universal joint torque connection with a central transverse portion of said truck frame, adjustable means supporting the opposite end of said structure from said truck frame, said structure carrying said non-rotatable elements and being operative to hold same against rotation, and means associated with said structure and cooperative with said assembly for rocking said structure relative to said truck frame about said universal joint connection for centralizing said non-rotatable elements with respect to said rotatable elements.

11. A brake mechanism for a vehicle truck having a wheel and axle assembly and a truck frame resiliently carried by said assembly, said mechanism comprising a plurality of spaced annular, rotatable friction braking elements disposed between the wheels of said assembly in concentric relation therewith and secured to rotate with said assembly, a plurality of annular, non-rotatable friction braking elements for frictionally engaging said rotatable elements, said non-rotatable elements encircling said axle and being capable of movement in a vertical direction relatively thereto, a rigid cradle like structure having at one end a universal joint torque connection with a central transverse portion of said truck frame, adjustable means supporting the opposite end of said structure from said truck frame, said structure carrying said non-rotatable elements and being operative to hold same against rotation, means carried by said structure and cooperative with said assembly for rocking said structure relative to said frame about said universal joint connection for centralizing said non-rotatable elements with said rotatable elements, and other means carried by said structure and operatively connected to said non-rotatable elements for controlling the operation thereof.

12. A brake mechanism for a vehicle truck having a wheel and axle assembly and a truck frame resiliently carried by said assembly, said mechanism comprising a plurality of spaced annular, rotatable friction braking elements disposed between the wheels of said assembly in concentric relation therewith and secured to rotate with said assembly, a plurality of annular, non-rotatable friction braking elements for frictionally engaging said rotatable elements, said non-rotatable elements encircling said axle and being capable of movement in a vertical direction relatively thereto, a rigid cradle like structure having at one end a universal joint torque connection with a central transverse portion of said truck frame, adjustable means supporting the opposite end of said structure from said truck frame, said structure carrying said non-rotatable elements and being operative to hold same against rotation, means carried by said structure and cooperative with said assembly for rocking said structure relative to said frame about said universal joint connection for centralizing said non-rotatable elements with said rotatable elements, a fluid pressure cylinder device carried by said structure operatively connected to said means for actuating same, and brake cylinder means carried by said structure operatively connected to said non-rotatable elements for controlling the operation thereof.

13. A brake mechanism for a vehicle truck having a wheel and axle assembly and a truck frame resiliently carried by said assembly, said mechanism comprising a plurality of spaced annular, rotatable friction braking elements disposed between the wheels of said assembly in concentric relation therewith and secured to rotate with said assembly, a plurality of annular, non-rotatable friction braking elements for frictionally engaging said rotatable elements, said non-rotatable elements encircling said axle and being capable of movement in a vertical direction relatively thereto, a rigid cradle like structure at one side of said assembly comprising a back portion extending transversely of and having centrally a universal joint torque connection with a central transverse portion of said truck frame, said structure having at each of its opposite ends a substantially horizontally extending portion extending in the direction of the length of the truck, spring means resiliently connecting said horizontally extending portions of the cradle to said truck frame, support bars extending transversely of said truck frame and secured to said horizontally extending portions for carrying said non-rotatable elements and for holding same against rotation, said non-rotatable elements being slidable on said bars in the direction of their length, means carried by said cradle and cooperative with said assembly for rocking said cradle about said torque connection to centralize said non-rotatable elements with said rotatable elements, and brake cylinder means carried by said cradle operatively connected to said non-rotatable elements for effecting movement thereof into and out of frictional engagement with said rotatable elements.

14. A brake mechanism for a vehicle truck having a wheel and axle assembly and a truck frame resiliently carried by said assembly, said mechanism comprising a plurality of spaced annular, rotatable friction braking elements disposed between the wheels of said assembly in concentric relation therewith and secured to rotate with said assembly, a plurality of annular, non-rotatable friction braking elements for frictionally engaging said rotatable elements, said non-rotatable elements encircling said axle and being capable of movement in a vertical direction relatively thereto, a rigid cradle like structure having centrally at one end a universal joint torque connection with a central transverse portion of said truck frame, and operatively connected at the opposite end to said non-rotatable elements for supporting and holding same against rotation, resilient means connecting said opposite end of said structure to said truck frame for supporting same, means associated with said structure and cooperative with said assembly for rocking said structure about said torque connection relative to said frame to centralize said non-rotatable elements with said rotatable elements; a fluid pressure cylinder device carried by said structure and operatively connected to said means for controlling the operation thereof, lever means carried by said structure operatively connected to said non-rotatable elements, and brake cylinder means carried by said structure operatively connected to said lever means for actuating said non-rotatable elements.

15. A brake mechanism for a vehicle truck having an oppositely disposed pair of wheels and a frame resiliently supported on said wheels, said mechanism comprising annular means secured to rotate with said pair of wheels in concentric relation therewith, annular, rotatable friction braking elements secured to said annular means in concentric relation therewith and rotatable therewith, annular non-rotatable friction braking elements for frictionally engaging said rotatable elements and being capable of movement in a vertical direction relative to said rotatable elements, a rigid structure comprising a back portion having centrally a universal joint connection with a central transverse portion of said frame and having a plurality of spaced, parallel arms extending in a substantially horizontal direction, means securing said non-rotatable elements to said arms for movement therewith and for holding same against rotation, resilient means connecting said arms to said frame for normally supporting said non-rotatable elements for movement with said frame relative to said rotatable elements, means associated with said structure and cooperative with said annular means for moving said non-rotatable elements relative to and into concentric relation with said rotatable elements, and other means carried by said structure for moving said non-rotatable elements into frictional braking engagement with said rotatable elements.

16. A brake mechanism for a vehicle truck having an oppositely disposed pair of wheels and a frame resiliently supported on said wheels, said mechanism comprising annular means secured to rotate with said pair of wheels in concentric relation therewith, annular, rotatable friction braking elements secured to said annular means in concentric relation therewith and rotatable therewith, annular non-rotatable friction braking elements for frictionally engaging said rotatable elements and being capable of movement in a vertical direction relative to said rotatable elements, a rigid structure comprising a back portion having centrally a universal joint connection with a central transverse portion of said frame and having a plurality of spaced, parallel arms extending in a substantially horizontal direction, and arranged in pairs with one of each pair above said axle and one below said axle, means carried by said arms carrying said non-rotatable elements and for holding same against rotation, resilient means connecting certain of said arms to said frame for supporting said structure and the mechanism carried thereby from said frame, centralizing means carried by each pair of arms cooperative with said annular means to rock said structure relative to said frame for centralizing said non-rotatable elements with said rotatable elements, and other means carried by said structure for actuating said non-rotatable elements.

17. A brake mechanism for a vehicle truck having an oppositely disposed pair of wheels and a frame resiliently supported on said wheels, said mechanism comprising annular means secured to rotate with said pair of wheels in concentric relation therewith, annular, rotatable friction braking elements secured to said annular means in concentric relation therewith and rotatable therewith, annular non-rotatable friction braking elements for frictionally engaging said rotatable elements and being capable of movement in a vertical direction relative to said rotatable elements, a rigid structure comprising a back portion having centrally a universal joint connection with a central transverse portion of said frame and having a plurality of spaced, parallel arms extending in a substantially horizontal direction, and arranged in pairs with one of each pair above said axle and one below said axle, means carried by said arms carrying said non-rotatable elements and for holding same against rotation, resilient means connecting certain of said arms to said frame for supporting said structure and the mechanism carried thereby from said frame, centralizing means carried by each pair of arms cooperative with said annular means to rock said structure relative to said frame for centralizing said non-rotatable elements with said rotatable elements, a fluid pressure operative cylinder device carried by said structure operatively connected to said centralizing means for controlling the operation thereof, a brake cylinder device carried by said structure operatively connected to certain of said non-rotatable elements for controlling the operation thereof, and another brake cylinder device carried by said structure operatively connected to other non-rotatable elements for controlling their operation.

18. A brake mechanism for a vehicle truck having an oppositely disposed pair of wheels and a frame resiliently supported on said wheels, said mechanism comprising annular means secured to rotate with said pair of wheels in concentric relation therewith, annular, rotatable friction braking elements secured to said annular means in concentric relation therewith and rotatable therewith, annular non-rotatable friction braking elements for frictionally engaging said rotatable elements and being capable of movement in a vertical direction relative to said rotatable elements, a rigid structure comprising a back portion having centrally a universal joint connection with a central transverse portion of said frame and having a plurality of spaced, parallel arms extending in a substantially horizontal direction, and arranged in pairs with one of each pair above said axle and one below said axle, means carried by said arms carrying said non-rotatable elements and for holding same against rotation, resilient means connecting certain of said arms to said frame for supporting said structure and the mechanism carried thereby from said frame, centralizing means carried by each pair of arms cooperative with said annular means to rock said structure relative to said frame for centralizing said non-rotatable elements with said rotatable elements, a fluid pressure operative cylinder device carried by said structure operatively connected to said centralizing means for controlling the operation thereof, and a single fluid pressure cylinder device operatively connected to said non-rotatable elements for actuating same.

19. A brake mechanism for a vehicle truck having a wheel and axle assembly and a truck frame resiliently supported by said assembly, said mechanism comprising a plurality of annular rotatable friction braking elements secured to said assembly for rotation therewith, a plurality of annular, non-rotatable friction braking elements for frictionally engaging said rotatable elements to brake said assembly, a rigid cradle like structure carrying at one end said non-rotatable elements and having at the opposite end a pivotal torque connection with said truck frame, means associated with said structure and cooperative with said assembly for holding said non-rotatable elements in cooperative relation with said rotatable elements, fluid pressure controlled brake cylinder means carried by said structure, and leverage means pivotally connected with said structure operatively connecting said brake cylinder means to said non-rotatable elements for controlling the operation thereof.

20. A brake mechanism for a vehicle truck having a wheel and axle assembly and a truck frame resiliently supported by said assembly, said mechanism comprising a plurality of annular rotatable friction braking elements secured to said assembly for rotation therewith, a plurality of annular, non-rotatable friction braking elements for frictionally engaging said rotatable elements to brake said assembly, a rigid cradle like structure having at one side a pivotal torque connection with a central transverse portion of said frame and having projecting from each end of the opposite side a pair of arms, one of each pair disposed above said axle and the other below, rigid parallel members connecting the arms above the axle and below the axle supporting said non-rotatable elements and for holding same against rotation, said non-rotatable elements being slidable on said rigid members, resilient means connecting certain of said arms to said truck frame for normally supporting said structure from said frame and operative to permit rocking of said structure relative to said frame about the torque connection therewith for moving said non-rotatable elements to a braking position in concentric relation with said rotatable elements, centralizing means slidably mounted between each pair of said arms adapted to cooperate with said assembly for rocking said structure to move said non-rotatable elements to said braking position, fluid pressure controlled means carried by said structure and operatively connected to said centralizing means for actuating same, and brake cylinder means also carried by said structure and operatively connected to said non-rotatable elements for actuating same.

21. A brake mechanism for a vehicle truck having a wheel and axle assembly and a truck frame resiliently supported on said assembly, said mechanism comprising a sleeve secured to and rotatable with said axle, said sleeve having an annular flange and at one side of said flange a cylindrical centering portion concentric with said wheels, an annular rotatable friction braking element secured to said flange for rotation with said wheels, an annular non-rotatable friction braking element adapted to frictionally engage said rotatable element for braking said wheels, a cradle pivotally connected at one end to said truck frame at one side of said axle and carrying at the opposite end said non-rotatable element, means resiliently supporting said opposite end of said cradle from said truck frame, centering means carried by said cradle adapted to be moved into engagement with the cylindrical centering portion of said sleeve for moving said non-rotatable element relative to said frame into concentric braking relation with said rotatable element, and means connected to said centering means for controlling the operation thereof.

22. A brake mechanism for a vehicle truck having a wheel and axle assembly and a truck frame resiliently supported on said assembly, said mechanism comprising an annular, rotatable friction braking element secured to rotate with said assembly, a non-rotatable friction braking element adapted to frictionally engage said rotatable element for effecting braking thereof, means for supporting said non-rotatable element from said frame and operable to permit movement thereof relative to said frame to a braking position with respect to said rotatable element, centralizing means connected to said non-rotatable element operative to effect movement of said non-rotatable element to said braking position, and means separate from and controlled by said centralizing means and operable to move said non-rotatable element into braking engagement with said rotatable element.

23. A brake mechanism for a vehicle truck having a wheel and axle assembly and a truck frame resiliently supported on said assembly, said mechanism comprising an annular, rotatable friction braking element secured to rotate with said assembly, a non-rotatable friction braking element adapted to frictionally engage said rotatable element for effecting braking thereof, means for supporting said non-rotatable element from said frame and operable to permit movement thereof relative to said frame to a braking position with respect to said rotatable element, brake control means for moving said non-rotatable element into braking engagement with said rotatable element, and centralizing means connected to said non-rotatable element and operative independently of said brake control means to effect movement of said non-rotatable element to said braking position and to delay the operation of said brake control means until after said braking position is obtained.

24. A brake mechanism for a vehicle truck having a wheel and axle assembly and a truck frame resiliently supported on said assembly, said mechanism comprising an annular rotatable friction braking element secured to rotate with said assembly, a non-rotatable friction braking element adapted to frictionally engage said rotatable element for effecting braking thereof, means for supporting said non-rotatable element from said frame and operable to permit movement thereof relative to said frame to a braking position with respect to said rotatable element, brake control means operable by fluid under pressure for moving said non-rotatable element into braking engagement with said rotatable element, and a centralizing cylinder device operable by fluid under pressure to move said non-rotatable element to said braking position and to then supply fluid under pressure to said brake control means for actuating same.

25. A brake mechanism for a wheel and axle assembly of a railway vehicle truck having a resiliently supported truck frame, said mechanism comprising adjacent each of the wheels of said assembly an annular rotatable friction braking element encircling said axle and secured to the wheel for rotation therewith, a non-rotatable friction braking element for frictionally engaging each of the rotatable elements to brake said assembly, a rigid structure carrying said non-rotatable elements and having at one side of said assembly a single pivotal support connection with said frame, means for providing a two point support for said structure on spaced portions of said assembly for securing said non-rotatable elements in braking relation with said rotatable elements, brake cylinder means carried by said structure and operatively connected to said non-rotatable elements for actuating same, and lever means carried by said structure and interposed in the operating connections between said brake cylinder means and non-rotatable elements.

CLYDE C. FARMER.